(12) United States Patent
Baumgart et al.

(10) Patent No.: US 7,915,321 B2
(45) Date of Patent: *Mar. 29, 2011

(54) AQUEOUS DISPERSION AND THE USE THEREOF IN THE PRODUCTION OF COATING AGENTS, ADHESIVES AND SEALING AGENTS THAT CAN BE CURED BY HEAT OR BY ACTINIC RADIATION

(75) Inventors: Hubert Baumgart, Münster (DE); Uwe Meisenburg, Duisburg (DE); Petra Toboll, Havixbeck (DE); Karl-Heinz Joost, Drensteinfurt (DE); Reinhold Schwalm, Wachenheim (DE)

(73) Assignee: BASF Coatings AG, Munster (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/344,057

(22) PCT Filed: Aug. 22, 2001

(86) PCT No.: PCT/EP01/09699

§ 371 (c)(1),
(2), (4) Date: Feb. 6, 2003

(87) PCT Pub. No.: WO02/16459

PCT Pub. Date: Feb. 28, 2002

(65) Prior Publication Data

US 2004/0068028 A1 Apr. 8, 2004

(30) Foreign Application Priority Data

Aug. 24, 2000 (DE) .................................. 100 41 634

(51) Int. Cl.
C08G 18/06 (2006.01)
B05D 7/00 (2006.01)

(52) U.S. Cl. ...................... 522/174; 522/173; 427/407.1

(58) Field of Classification Search .................. 522/148, 522/173, 174; 427/407.1
See application file for complete search history.

(56) References Cited

U.S. PATENT DOCUMENTS

| | | | |
|---|---|---|---|
| 3,364,175 A * | 1/1968 | Di Paola ........................ 528/34 |
| 4,066,591 A * | 1/1978 | Scriven et al. ................ 524/840 |
| 4,268,542 A | 5/1981 | Sakakibara et al. ........... 427/195 |
| 4,419,513 A | 12/1983 | Breidenbach et al. |
| 4,444,954 A | 4/1984 | Mels et al. |
| 4,454,317 A | 6/1984 | Disteldorf et al. |
| 4,675,234 A | 6/1987 | Sachs et al. .................. 428/328 |
| 4,677,221 A | 6/1987 | Muller et al. |
| 4,710,542 A | 12/1987 | Forgione et al. |
| 4,801,675 A | 1/1989 | Pedain et al. |
| 5,028,639 A | 7/1991 | Treutlein et al. |
| 5,028,683 A * | 7/1991 | Martens et al. ................ 528/75 |
| 5,144,031 A | 9/1992 | Pedain |
| 5,258,452 A | 11/1993 | Reiff |
| 5,258,482 A | 11/1993 | Jacobs et al. |
| 5,290,663 A * | 3/1994 | Huynh-Tran ............... 430/284.1 |
| 5,290,902 A | 3/1994 | Jacobs et al. |
| 5,369,207 A | 11/1994 | Wolff et al. |
| 5,425,970 A | 6/1995 | Lahrmann et al. ............. 427/493 |
| 5,508,379 A * | 4/1996 | Menovcik et al. ............. 528/367 |
| 5,589,228 A | 12/1996 | Wegner et al. .............. 427/407.1 |
| 5,601,878 A | 2/1997 | Kranig et al. ................... 427/386 |
| 5,665,433 A * | 9/1997 | Moussa et al. ................. 427/377 |
| 5,726,274 A * | 3/1998 | Menovcik et al. ............... 528/85 |
| 5,760,127 A * | 6/1998 | Bammel et al. ................ 524/590 |
| 5,965,213 A | 10/1999 | Sacharski et al. ............. 427/475 |
| 6,159,556 A | 12/2000 | Möller et al. .................. 427/475 |
| 6,162,506 A | 12/2000 | Lettmann et al. ........... 427/407.1 |
| 6,309,707 B1 | 10/2001 | Mayer et al. ................... 427/386 |
| 6,344,501 B1 | 2/2002 | Sjerakowski et al. ......... 523/410 |
| 6,403,699 B1 | 6/2002 | Rockrath et al. |
| 6,610,777 B1 * | 8/2003 | Anderson et al. .............. 524/588 |
| 6,617,413 B1 | 9/2003 | Bruchmann et al. |
| 6,747,091 B1 | 6/2004 | Baumgart et al. |
| 6,777,090 B2 * | 8/2004 | Baumgart et al. ......... 428/423.1 |
| 6,927,253 B2 | 8/2005 | Lassmann et al. |
| 7,122,595 B1 | 10/2006 | Ott et al. |
| 2007/0232776 A1 * | 10/2007 | Menovcik et al. ............. 528/128 |

FOREIGN PATENT DOCUMENTS

| | | |
|---|---|---|
| CA | 2079498 | 9/1992 |
| CA | 2086156 | 12/1992 |
| CA | 2079498 A1 | 4/1993 |
| CA | 2086156 A1 | 6/1993 |
| CA | 2163591 A1 | 6/1996 |
| CA | 2258813 | 5/1999 |
| CA | 2258813 A1 | 7/1999 |
| CA | 2356685 | 12/1999 |
| CA | 2 386 222 | 4/2001 |
| DE | 3636183 A1 | 3/1988 |
| DE | 4015155 A1 | 11/1991 |
| DE | 4222194 A1 | 1/1994 |
| DE | 4421823 A1 | 1/1996 |
| DE | 4429183 A1 | 1/1996 |
| DE | 19613547 A1 | 11/1996 |
| DE | 19947045 A1 | 4/2000 |
| DE | 19860041 A1 | 6/2000 |

(Continued)

OTHER PUBLICATIONS

English Language Abstract for EP 0 841 357.

(Continued)

*Primary Examiner* — Elena T Lightfoot

(74) *Attorney, Agent, or Firm* — Cantor Colburn LLP

(57) ABSTRACT

Novel aqueous dispersion comprising at least one polymer containing on average (i) at least one primary and/or secondary carbamate group, (ii) at least one functional group having at least one bond which may be activated with actinic radiation, and (iii) at least one dispersive ionic functional group; process for preparing it and its use for preparing coating materials, adhesives and sealing compounds which are curable thermally and with actinic radiation, and also novel coating materials, adhesives and sealing compounds consisting of or comprising the novel aqueous dispersion.

29 Claims, No Drawings

FOREIGN PATENT DOCUMENTS

| | | | |
|---|---|---|---|
| EP | 0183976 | A1 | 6/1986 |
| EP | 0245700 | A2 | 11/1987 |
| EP | 0249201 | A2 | 12/1987 |
| EP | 0276501 | A2 | 8/1988 |
| EP | 0303150 | A2 | 2/1989 |
| EP | 0496208 | A2 | 7/1992 |
| EP | 0524500 | A1 | 1/1993 |
| EP | 0531820 | A1 | 3/1993 |
| EP | 0540884 | A1 | 5/1993 |
| EP | 0548873 | A2 | 6/1993 |
| EP | 0566037 | A2 | 10/1993 |
| EP | 0568967 | A2 | 11/1993 |
| EP | 0646608 | A1 | 4/1995 |
| EP | 0649806 | A1 | 4/1995 |
| EP | 0928800 | A1 | 12/1998 |
| WO | 94/22968 | A1 | 10/1994 |
| WO | 96/32452 | A1 | 10/1994 |
| WO | 97/12945 | A1 | 4/1997 |

OTHER PUBLICATIONS

English Language Abstract for DE 196 45 761.
U.S. Appl. No. 10/130,934, filed May 23, 2002.
U.S. Appl. No. 10/276,956, filed Nov. 19, 2002.
U.S. Appl. No. 09/890,520, filed Jul. 31, 2001.
U.S. Appl. No. 09/889,818, filed Jul. 20, 2001.
U.S. Appl. No. 10/130,648, filed May 21, 2002.
U.S. Appl. No. 10/130,934, filed May 23, 2002.
U.S. Appl. No. 321,082, filed Nov. 10, 1994, U.S. Patent No. 5,589,228.
DE 19613547, Publication date: Nov. 7, 1996, Abstract, 1 page.
DE 19947045, Publication date: Apr. 6, 2000, Abstract, 1 page.
WO 96/32452, Publication date: Oct. 17, 1996, Abstract, 1 page.
International Preliminary Report on Patentability for International Application No. PCT/EP2001/009699, Dated: Apr. 9, 2002, 2 pages.
International Search Report for International Application No. PCT/EP2001/009699, Dated: Jan. 22, 2002, 3 pages.

* cited by examiner

AQUEOUS DISPERSION AND THE USE THEREOF IN THE PRODUCTION OF COATING AGENTS, ADHESIVES AND SEALING AGENTS THAT CAN BE CURED BY HEAT OR BY ACTINIC RADIATION

CROSS REFERENCE TO RELATED APPLICATIONS

This application is a National Phase Application of Patent Application PCT/EP01/09699 filed on 22 Aug. 2001, which claims priority to DE 100 41 634.9, filed on 24 Aug. 2000.

The present invention relates to a novel aqueous dispersion. The present invention further relates to a novel process for preparing aqueous dispersions. The present invention additionally relates to the use of the novel aqueous dispersions to prepare coating materials, adhesives, and sealing compounds which are curable thermally and with actinic radiation. The present invention relates not least to novel coating materials, adhesives, and sealing compounds which are curable thermally and with actinic radiation. Moreover, the present invention relates to the use of the novel coating materials, adhesives, and sealing compounds which are curable thermally and with actinic radiation to produce novel coatings, adhesive films, and seals.

Automobile manufacturers and their customers are subjecting automotive OEM finishes and refinishes to increasing requirements in terms of corrosion resistance, mechanical stability—resistance to scratching by wash brushes, for example—stonechip resistance, and the overall visual impression, including the optical effects. As is known, these requirements are met to a certain extent by a multicoat system comprising, above one another on a metal bodywork panel, an electrodeposition coat, a surfacer coat or antistonechip primer coat, and a multicoat color and/or effect system comprising a color and/or effect basecoat and at least one clearcoat.

In addition, however, the coatings are also required to meet the environmental requirements, which have risen continuously in recent years, such as the reduction in the amount of organic solvents, or complete absence of solvent.

In the course of these developments, aqueous coating materials have gradually been able to establish themselves. For instance, the electrodeposition coating materials have for a long time already been virtually free from volatile organic constituents, especially organic solvents. Likewise, aqueous coating materials based on polyurethanes are available which are used to produce surfacer coatings or antistonechip primer coats (cf. Patents DE 40 05 961 A1 and EP 0 548 873 A1).

The use of aqueous basecoats as well, as described for example in Patent DE 197 22 862 C1, has made significant progress and has persistently reduced the emissions of volatile organic constituents.

Also available now are solvent-free or substantially solvent-free clearcoats such as aqueous two-component (2K) or multi-component (3K, 4K) clearcoats, powder clearcoats, powder slurry clearcoats, or liquid, solvent-free clearcoats curable with actinic radiation (100% systems).

The actinic radiation may comprise electromagnetic radiation such as visible light, UV light or X-rays, or corpuscular radiation such as electron beams.

Aqueous two-component (2K) or multi-component (3K, 4K) clearcoats are disclosed, for example, in German Patent DE 44 21 823 A1. The essential constituents of two-component (2K) or multi-component (3K, 4K) clearcoats are known to be hydroxyl-containing binders and polyisocyanate crosslinking agents, which must be stored separately prior to their use.

Powder clearcoats are known, for example, from German Patent DE 42 22 194 A1 and the BASF Lacke+Farben AG product information leaflet "Pulverlacke" [powder coatings], 1990. The familiar essential constituents of powder clearcoats are binders containing epoxide groups and crosslinking agents comprising polycarboxylic acids.

Powder slurry clearcoats are known, for example, from U.S. Pat. No. 4,268,542 A, International Patent Application WO 96/32452 and German Patent Applications DE 195 18 392 A1 and DE 196 13 547 A1, and are described in German Patent Application DE 198 14 471.7, unpublished at the priority date of the present specification. Powder slurry clearcoats comprise, as is known, powder clearcoats in dispersion in an aqueous medium.

Clearcoats curable with actinic radiation are disclosed, for example, in Patents EP 0 540 884 A1, EP 0 568 967 A1, and U.S. Pat. No. 4,675,234 A. Their familiar constituents are compounds of low molecular mass, oligomeric compounds and/or polymeric compounds which are curable with actinic light and/or electron beams, preferably radiation-curable binders, based in particular on ethylenically unsaturated prepolymers and/or ethylenically unsaturated oligomers; if desired, one or more reactive diluents; and, if desired, one or more photoinitiators. Examples of suitable radiation-curable binders are (meth)acryloyl-functional (meth)acrylate copolymers, polyether acrylates, polyester acrylates, unsaturated polyesters, epoxy acrylates, urethane acrylates, amino acrylates, melamine acrylates, silicone acrylates, and the corresponding methacrylates. It is preferred to use binders that are free from aromatic structural units.

European Patent Application EP 0 928 800 A1 discloses a dual-cure coating material—curable thermally and with actinic radiation—comprising a urethane (meth)acrylate containing free isocyanate groups and (meth)acryloyl groups, a photoinitiator, and an isocyanate-reactive compound, especially a polyol or polyamine. This dual-cure coating material affords the opportunity to vary the profile of properties of coating material and coating and to tailor it to different end uses.

The disadvantage of the known dual-cure coating materials is that they are two-component systems, where the constituents containing free isocyanate groups must be stored separately from the constituents containing isocyanate reactive groups in the absence of water until the time of their application, in order to prevent premature crosslinking. This, however, requires a high level of technical and planning effort for storage, preparation, and application.

In the context of the production of multicoat color and/or effect systems, the known aqueous basecoats and clearcoats are processed preferably by the so-called wet-on-wet technique. In the wet-on-wet technique, as is known, a basecoat material is applied to a primed or unprimed substrate, after which the resultant basecoat film is dried, overcoated with a clearcoat material, and the resultant clearcoat film is cured together with the basecoat film, so giving the multicoat system comprising color and/or effect basecoat and protective clearcoat.

In the context of the wet-on-wet technique, the individual types of clearcoat have specific strengths and weaknesses.

The aqueous clearcoats, for instance, may penetrate the dried aqueous basecoat film during or after their application. Powder clearcoats may not flow out sufficiently during curing, leading to structured surfaces.

After they have cured, clearcoats based on two-component (2K) or multi-component (3K, 4K) clearcoat materials are stable to weathering but often not sufficiently abrasion-resistant. Clearcoats curable with actinic radiation often exhibit severe shrinkage in the course of their curing, leading to delamination as a result of internal stresses. Furthermore, following their application to substrates of relatively complex shape, they may be cured inadequately in the shadow regions. Powder slurry clearcoats are more or less incompatible with some frequently used aqueous basecoats, which may lead to cracking (mud cracking) in the multicoat system and to delamination of the coats.

German Patent Application DE 196 45 761 A1 discloses hydrophilic self-crosslinking polyurethanes containing olefinically unsaturated groups and terminal blocked isocyanate groups. The blocking agents therein, however, are not specified in detail. These known hydrophilic self-crosslinking polyurethanes are used to prepare graft copolymers by the emulsion polymerization method. The resultant dispersions of the graft copolymers are used to prepare aqueous basecoats, and not clearcoats. The production of multicoat color and/or effect systems by the wet-on-wet technique, in which basecoat films are overcoated with clearcoat films and then the two films are cured together, is not addressed in the patent application. Nor is there any description in the patent application of the combination of thermal curing and curing with actinic radiation (dual cure).

German Patent DE 197 22 862 C1 discloses an externally crosslinking graft copolymer obtainable by polymerizing olefinically unsaturated monomers in a dispersion of an olefinically unsaturated polyurethane containing hydrophilic functional groups and containing on average per molecule from 0.05 to 1.1 polymerizable pendent and/or terminal double bonds. The known externally crosslinking graft copolymers of DE 197 22 862 C1 are in the form of primary dispersions and are highly suitable for preparing aqueous externally crosslinking coating materials, especially aqueous basecoats. They may comprise blocked isocyanates as crosslinking agents. The externally crosslinking aqueous basecoats may be used with advantage to produce multicoat color and/or effect systems by the wet-on-wet technique. The patent, however, does not describe the use of the primary dispersions to prepare clearcoats which can be cured thermally and with actinic radiation.

In the context of the present invention, the term "self-crosslinking" refers to the capacity of a binder (regarding the term, cf. Römpp Lexikon Lacke und Druckfarben, Georg Thieme Verlag, Stuttgart, N.Y., 1998, "Binders", pages 73 and 74) to undergo crosslinking reactions with itself. This requires that the binders already contain both kinds of complementary reactive functional groups which are necessary for crosslinking. "Externally crosslinking", on the other hand, is the term used for those coating materials in which one kind of the complementary reactive functional groups is present in the binder and the other kind in a curing or crosslinking agent. For further details, reference is made to Römpp, op. cit., "Curing", pages 274 to 276, especially bottom page 275.

German Patent Application DE 199 47 045.5, unpublished at the priority date of the present specification, describes a clearcoat which is curable thermally and with actinic radiation and is based on an aqueous dispersion containing hydroxyl groups, blocked isocyanate groups and olefinically unsaturated groups, and dispersive ionic groups. The use of these clearcoats in the context of the wet-on-wet technique is not described therein.

German Patent Application DE 199 58 726.4, unpublished at the priority date of this present specification, describes a powder slurry curable thermally and with actinic radiation and comprising at least one aqueous dispersion. The dispersion is prepared from aliphatic polyisocyanates, compounds containing isocyanate-reactive functional groups and bonds which may be activated by actinic radiation, low molecular mass aliphatic compounds containing isocyanate-reactive functional groups, compounds containing isocyanate-reactive functional groups and dispersive functional groups, neutralizing agents for the dispersive functional groups, and blocking agents for isocyanate groups and/or compounds containing blocked isocyanate groups, the blocked isocyanate groups being introduced into the dispersion by way of the reaction of the blocking agents with isocyanato-containing polyurethane prepolymers. The use of carbamate groups is not described in this patent application.

German Patent Application DE 199 08 013.5, unpublished at the priority date of the present specification, describes a pseudoplastic powder slurry curable with actinic radiation and, possibly, thermally, comprising solid spherical particles with an average size of from 0.8 to 20 µm and a maximum size of 30 µm, the powder clearcoat slurry containing from 0.05 to 1 meq/g of ion-forming dispersive groups, corresponding to an average acid number or amine number of from 3 to 56 g KOH/g solids (MEQ acid or amine of from 0.05 to 1.0 meq/g solids), preferably up to 28 (MEQ acid or amine: 0.5), and in particular up to 17 (MEQ acid or amine: 0.3), having a neutralizing agent content of from 0.05 to 1 meq/g and a viscosity of (i) from 50 to 1000 mPas at a shear rate of 1000 s$^{-1}$, (ii) from 150 to 8000 mPas at a shear rate of 10 s$^{-1}$, and (iii) from 180 to 12,000 mPas at a shear rate of 1 s$^{-1}$. Furthermore, the powder clearcoat slurry may comprise binders containing reactive functional groups such as hydroxyl groups, for example, which are able to undergo thermal crosslinking reactions with crosslinking agents such as blocked isocyanates. The use of carbamate groups such as —O—C(O)—NH$_2$ is not described in the patent application.

German Patent Application DE 199 08 018.6, unpublished at the priority date of the present specification, describes a dual-cure powder clearcoat slurry comprising constituents containing both groups (A) which may be activated with actinic radiation and complementary reactive functional groups (B) which undergo thermal crosslinking reactions. Carbamate groups such as —O—C(O)—NH$_2$ are not used as groups (B).

German Patent Application DE 199 61 926.3, unpublished at the priority date of the present specification, describes compositions curable thermally and with actinic radiation which may be used, inter alia, to prepare powder slurry coating materials. The compositions comprise a constituent (A) preparable from a polyisocyanate, a compound containing at least one bond which may be activated with actinic radiation and an isocyanate-reactive functional group, and at least one compound containing at least one carbamate group and an isocyanate-reactive functional group. The constituent (A) may contain hydrophilic groups such as poly(ethylene oxide) monoalkyl ethers. The use of potentially anionic functional groups as dispersive groups and of neutralizing agent for said groups is not described in the patent application. Furthermore, the constituents (A) contain no isocyanate-reactive functional groups such as hydroxyl groups.

German Patent Application DE 100 27 292.4, unpublished at the priority date of the present specification, describes dual-cure powder slurry clearcoats comprising numerous different polymers as binders, including polyurethanes. The binders may contain numerous different complementary reactive functional groups which undergo thermal crosslinking reactions, these groups including isocyanate-reactive functional groups and carbamate groups —O—C(O)—NH$_2$. As crosslinking agents, amino resins may be used. No details are given regarding the preparation of an aqueous dispersion of a polyurethane containing functional groups which may be activated with actinic radiation, isocyanate-reactive functional groups, dispersive functional groups such as carboxyl groups and carbamate groups. Where carboxyl groups are employed in the context of the patent application, they are used for thermal crosslinking with epoxide groups as complementary reactive functional groups.

It is an object of the present invention to find a new aqueous dispersion which permits the preparation of new coating materials curable thermally and with actinic radiation. In particular, the coating materials should be suitable for use as powder slurry clearcoats.

Furthermore, the new aqueous dispersion should also be suitable for the preparation of adhesives and sealing compounds.

The coating materials, adhesives and sealing compounds based on the new aqueous dispersions should give coatings, adhesives [sic], and seals which exhibit excellent weathering stability, chemical resistance, hardness, flexibility, and scratch resistance and which do not tend toward yellowing.

It is a further object of the present invention to find a new process for preparing aqueous dispersions.

It is yet another object of the present invention to provide a new process for producing multicoat color and/or effect systems, said process being devoid of the disadvantages of the prior art and instead providing, safely and reliably, multicoat systems which are of the utmost optical quality as regards color, effect, gloss and DOI (distinctness of the reflected image), have a smooth, unstructured, hard, flexible, and scratch-resistant surface, are weathering-stable, chemical-resistant and etch-resistant, do not yellow, and show no cracking or delamination of the coats.

Accordingly, we have found the novel aqueous dispersion comprising at least one polymer containing on average
(i) at least one primary and/or secondary carbamate group,
(ii) at least one functional group having at least one bond which may be activated with actinic radiation, and
(iii) at least one dispersive ionic functional group, referred to below as the "dispersion of the invention".

We have also found the novel coating materials, adhesives, and sealing compounds which comprise the dispersions of the invention and/or the polyurethane dispersions obtained by means of the preparation process of the invention, referred to below as the "coating materials, adhesives, and sealing compounds of the invention".

Further subject matter of the invention will emerge from the description.

In the light of the prior art it was surprising and unforeseeable for the skilled worker that the object on which the present invention was based might be achieved by means of the dispersion of the invention. A particular surprise was that the dispersion of the invention possessed such extremely broad applicability and permitted the preparation of coating materials, adhesives, and sealing compounds which even on substrates of complex shape could be cured completely to give coatings, adhesive films, and seals which were highly scratch-resistant and chemical-resistant and did not tend toward yellowing. It should be highlighted in particular that by means of the dispersion of the invention it was possible to produce multicoat systems exclusively on the basis of aqueous coating materials.

The dispersion of the invention comprises at least one polymer.

The amount of the polymer in the dispersion of the invention may vary very widely. It is preferably from 10 to 70, more preferably from 12 to 68, with particular preference from 13 to 66, with very particular preference from 14 to 64, and in particular from 15 to 62% by weight, based in each case on the dispersion of the invention.

The polymer contains on average at least one primary and/or secondary carbamate group of the general formula I

$$—O—C(O)—NHR \qquad (I),$$

where the variable R is a hydrogen atom or an organic radical. Examples of suitable organic radicals are alkyl groups of 1 to 18 carbon atoms, cycloalkyl groups of 3 to 12 carbon atoms, aryl groups of 6 to 20 carbon atoms, and arylalkyl groups of 6 to 30 carbon atoms. Preferably, primary carbamate groups are used.

In accordance with the invention it is of advantage if the polymer contains on average more than one, preferably more than two, with particular preference more than three, with very particular preference more than four, and in particular more than five carbamate groups of the general formula I.

The polymer contains on average at least one functional group having at least one bond which may be activated with actinic radiation.

In the context of the present invention, actinic radiation is electromagnetic radiation such as near infrared (NIR), visible light, UV radiation or X-rays, especially UV radiation, or corpuscular radiation such as electron beams.

A bond which may be activated with actinic radiation is a bond which on exposure to actinic radiation becomes reactive and, with other activated bonds of its kind, undergoes polymerization reactions and/or crosslinking reactions which proceed in accordance with free-radical and/or ionic mechanisms. Examples of suitable bonds are carbon-hydrogen single bonds and carbon-carbon, carbon-oxygen, carbon-nitrogen, carbon-phosphorus, and carbon-silicon single or double bonds. Of these, the carbon-carbon double bonds are particularly advantageous and are therefore used with very particular preference in accordance with the invention. For brevity, they are referred to below as "double bonds".

Particularly suitable double bonds are present, for example, in (meth)acrylate, ethacrylate, crotonate, cinnamate, vinyl ether, vinyl ester, dicyclopentadienyl, norbornenyl, isoprenyl, isopropenyl, allyl, and butenyl groups; dicyclopentadienyl ether, norbornenyl ether, isoprenyl ether, isopropenyl ether, allyl ether, and butenyl ether groups; and dicyclopentadienyl ester, norbornenyl ester, isoprenyl ester, isopropenyl ester, allyl ester, and butenyl ester groups. Of these, the acrylate groups offer very particular advantages, and so are used with very particular preference in accordance with the invention.

In accordance with the invention it is of advantage if the polymer contains on average more than one, preferably more than two, with particular preference more than three, with very particular preference more than four, and in particular more than five of the above-described functional groups that may be activated with actinic radiation.

The polymer contains on average at least one dispersive (potentially) ionic functional group. Examples of suitable (potentially) cationic groups are amino groups. Examples of suitable (potentially) anionic groups are carboxylic acid, sulfonic acid, and phosphonic acid groups, especially carboxylic acid groups. In the dispersion for use in accordance with the invention they are present in an amount such as to give, based on the solids of the dispersion of the invention, an acid number or amine number of from 3.0 to 100, preferably from 4.0 to 90, more preferably from 5.0 to 80, with particular preference from 6.0 to 70, with very particular preference from 6.0 to 60, and in particular from 6 to 50 mg KOH/g. In this context, dispersive (potentially) anionic functional groups are of advantage.

The polymer may contain on average at least one isocyanate-reactive functional group. Examples of suitable isocyanate-reactive functional groups are thiol, hydroxyl and/or primary and/or secondary amino groups, especially hydroxyl groups. It may of advantage if the polymer contains on average more than one, preferably more than two, with particular preference more than three, with very particular preference more than four, and in particular more than five isocyanate-reactive functional groups.

Examples of suitable polymers are random, alternating and/or block, linear and/or branched and/or comb (co)polymers of ethylenically unsaturated monomers, and polyaddition resins and/or polycondensation resins. Regarding these terms, reference is made to Römpp, op. cit., page 457, "Polyaddition" and "Polyaddition resins (polyadducts)", and pages 463 and 464, "Polycondensates", "Polycondensation", and "Polycondensation resins".

Examples of highly suitable polymers are linear and/or branched and/or block, comb and/or random poly(meth)acrylates or acrylate copolymers, polyesters, alkyds, polyurethanes, acrylated polyurethanes, acrylated polyesters, polylactones, polycarbonates, polyethers, epoxy resin-amine adducts, (meth)acrylatediols, partially hydrolyzed polyvinyl esters, and polyureas, but especially polyurethanes.

The polymers are prepared by means of conventional methods from appropriate starting compounds containing (i) primary and/or secondary carbamate groups and/or groups convertible to carbamate groups, (ii) functional groups having at least one bond which may be activated with actinic radiation, and/or (iii) dispersive (potentially) ionic functional groups, and, if desired, (iv) isocyanate-reactive functional groups. Alternatively, the groups in question may be introduced into the parent structures of the polymers by means of polymer-analogous reactions. In that case the resultant polymers are dispersed in water or in an aqueous medium (secondary dispersion), where they have not been prepared in water or in an aqueous medium (primary dispersion).

Particularly advantageous dispersions of the invention are polyurethane dispersions.

Especially advantageous dispersions of the invention comprise at least one polyurethane preparable by reacting, in a procedure in accordance with the invention,
(A) at least one aliphatic polyisocyanate having an isocyanate functionality of from 2.0 to 6.0 with
(B) at least one compound containing at least one isocyanate-reactive functional group and at least one bond that may be activated with actinic radiation,
(C) at least one low molecular mass aliphatic compound containing at least two isocyanate-reactive functional groups,
(D) at least one compound containing at least one isocyanate-reactive functional group and at least one dispersive (potentially) ionic, especially anionic, functional group,
(E) at least one neutralizing agent for the dispersive functional groups of the compound (D), and
(F) at least one compound containing at least one primary and/or secondary carbamate group and/or at least one functional group which may be converted into a carbamate group, and at least one isocyanate-reactive group, and also, if desired,
(G) at least one compound containing an isocyanate-reactive functional group, other than the compounds (B) to (F).

The aliphatic—including cycloaliphatic—polyisocyanate (A) has an isocyanate functionality of from 2.0 to 6.0, preferably from 2.0 to 5.0, more preferably from 2.0 to 4.5, and in particular from 2.0 to 3.5. In the context of the present invention, the term "cycloaliphatic diisocyanate" refers to a diisocyanate in which at least one isocyanate group is attached to a cycloaliphatic radical.

Examples of suitable cycloaliphatic polyisocyanates (A) having an isocyanate functionality of 2.0 are isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate or dicyclohexylmethane 4,4,'-diisocyanate, especially isophorone diisocyanate.

Examples of suitable acyclic aliphatic diisocyanates for use in accordance with the invention are trimethylene diisocyanate, tetramethylene diisocyanate, pentamethylene diisocyanate, hexamethylene diisocyanate, ethylethylene diisocyanate, trimethylhexane diisocyanate, heptanemethylene [sic] diisocyanate, and diisocyanates derived from dimeric fatty acids, as marketed under the commercial designation DDI 1410 by the Company Henkel and described in Patents WO 97/49745 and WO 97/49747, especially 2-heptyl-3,4-bis(9-isocyanatononyl)-1-pentycyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane.

Of these, hexamethylene diisocyanate is of particular advantage and is therefore used with very particular preference in accordance with the invention.

Examples of suitable polyisocyanates (A) having an isocyanate functionality >2 are polyisocyanates, especially those based on hexamethylene diisocyanate which contain isocyanurate, biuret, allophanate, iminooxadiazinedione, urethane, urea, carbodiimide and/or uretdione groups and are obtainable in conventional manner from the above-described diisocyanates. Advantageous such polyisocyanates (A) are those containing allophanate groups and/or isocyanurate groups, especially those based on hexamethylene diisocyanate, and so it is these that are used with particular preference in accordance with the invention. Examples of suitable preparation processes and polyisocyanates are known, for example, from Patents CA 2,163,591 A, U.S. Pat. No. 4,419,513 A, U.S. Pat. No. 4,454,317 A, EP 0 646 608 A1, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. No. 5,258,482 A, U.S. Pat. No. 5,290,902 A, EP 0 649 806 A1, DE 42 29 183 A1, and EP 0 531 820 A1.

Examples of suitable compounds (B) containing at least one, especially one, functional group and having per molecule at least one bond that may be activated with actinic radiation are
allyl alcohol or 4-butyl vinyl ether;
hydroxyalkyl esters and hydroxycycloalkyl esters of acrylic acid or methacrylic acid, especially of acrylic acid, obtainable by esterifying aliphatic diols, examples being the above-described low molecular mass diols (B) [sic], with acrylic acid or methacrylic acid, or by reacting acrylic acid or methacrylic acid with an alkylene oxide, especially hydroxyalkyl esters of acrylic acid or methacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl, bis(hydroxymethyl)cyclohexane acrylate or methacrylate; of these, 2-hydroxyethyl acrylate and 4-hydroxybutyl acrylate are particularly advantageous and are therefore used with particular preference in accordance with the invention; and reaction products of cyclic esters, such as epsilon-caprolactone, for example, and these hydroxyalkyl or hydroxycycloalkyl esters.

Examples of suitable low molecular mass aliphatic compounds (C) containing at least two, especially two, isocyanate-reactive functional groups are polyols, especially diols, polyamines, especially diamines, and amino alcohols. Normally, the polyols and/or polyamines are used alongside the diols and/or diamines in minor amounts in order to introduce branching points into the polyurethanes. In the context of the present invention, minor amounts are amounts which do not cause gelling of the polyurethanes during their preparation. This applies mutatis mutandis to the amino-alcohols.

Examples of suitable diols (C) are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethyl-butylpropanediol, the positionally isomeric diethyloctanediols, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo [2.2.1]heptane, 2,2-diethyl-1,3-propanediol, 2,2-dipropyl-1, 3-propanediol, 2-cyclohexyl-2-methyl-1,3-propanediol, 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, dihydroxymethylcyclohexane, bis(hydroxycyclohexyl)propane, tetramethylcyclobutanediol, cyclooctanediol or norbornanediol, especially 1,2-, 1,3- and/or 1,4-cyclohexanedimethanol, which are referred to collectively below as cyclohexanedimethanol.

Examples of suitable polyols (C) are trimethylolethane, trimethylolpropane and glycerol, pentaerythritol or homopentaerythritol and sugar alcohols such as threitol or erythritol or pentitols such as arabitol, adinitol or xylitol or hexitols such as sorbitol, mannitol or dulcitol.

Examples of suitable diamines (C) are hydrazine, ethylenediamine, propylenediamine, 1,4-butylenediamine, piperazine, 1,4-cyclohexyldi methylamine, 1,6-hexamethylenediamine, trimethylhexamethylenediamine, methanediamine [sic], isophoronediamine, and 4,4,'-diaminodicyclohexylmethane.

Examples of suitable polyamines (C) are diethylenetriamine, triethylenetetramine, dipropylenediamine, and dibutylenetriamine.

Examples of suitable amino alcohols (C) are ethanolamine, diethanolamine, and triethanolamine.

Of these compounds (C), cyclohexanedimethanol offers particular advantages and is therefore used with preference in accordance with the invention.

Examples of suitable compounds (D), containing at least one isocyanate-reactive functional group and at least one dispersive functional group, in particular a (potentially) anionic group, are mercapto-, hydroxy-, amino- or iminocarboxylic, -phosphonic or -sulfonic acids, such as mercapto acetic acid (thio glycolic acid), mercaptopropionic acid, mercaptosuccinic acid, hydroxy acetic acid, hydroxydecanoic acid, hydroxydodecanoic acid, 12-hydroxystearic acid, hydroxyethanesulfonic acid, hydroxypropanesulfonic acid, mercaptoethanesulfonic acid, mercaptopropanesulfonic acid, aminopropanesulfonic acid, glycine, iminodiacetic acid, 2,2-dimethylolacetic acid, 2,2-dimethylolpropionic acid, 2,2-dimethylolbutyric acid, 2,2-dimethylolpentanoic acid, α,δ-diaminovaleric acid, 3,4-diaminobenzoic acid, 2,4-diaminotoluenesulfonic acid, and 2,4-diaminodiphenyl ether sulfonic acid, especially hydroxyacetic acid. They are used in amounts such that the above-described acid numbers are obtained.

Examples of suitable neutralizing agents (E) for the potentially anionic groups of the compound (D) are alkali metal and alkaline earth metal hydroxides, oxides, carbonates, and hydrogen carbonates, and also ammonia and organic primary, secondary and/or tertiary amines, such as monoethanolamine, diethanolamine, diethylamine, monoisopropanolamine, diisopropanolamine, morpholine, 2-amino-2-methyl-1-propanol, trimethylamine, triethylamine, tributylamine, dimethylaniline, diethylaniline, triphenylamine, dimethylethanolamine, diethylethanolamine, methyldiethanolamine, 2-aminomethylpropanol, dimethylisopropylamine, and/or dimethylisopropanolamine, for example.

Examples of suitable compounds (F) containing at least one, especially one, carbamate group and/or at least one, especially one, functional group which may be converted into carbamate groups are hydroxyethyl carbamate or hydroxypropyl carbamate, especially hydroxypropyl carbamate. An example of a suitable functional group which may be converted into a carbamate group is the cyclic ethylene carbonate group, which may be converted into a primary carbamate group using ammonia. The ethylene carbonate group itself may be prepared by reacting the polyisocyanate, the polyacid or the polyepoxide with, for example, glycidol and then reacting the epoxide groups with carbon dioxide. In the case of the polyepoxides, care should be taken to ensure that at the time of the reaction with carbon dioxide there are no longer any epoxide groups attached to the parent structure.

Examples of suitable compounds (G), which are different from the compounds (B) to (F) and contain an isocyanate-reactive functional group, are alcohols or monoamines (C) such as ethanol, propanol, n-butanol, sec-butanol, tert-butanol, amyl alcohols, hexanols, fatty alcohols, phenol, allyl alcohol or ethylhexylamine. They are used preferably in conjunction with compounds (C) of higher functionality, in order to prevent gelling of the polyurethanes during their preparation.

Via the amount of the dispersive ionic functional groups and their degree of neutralization, in particular, it is possible to control the preparation of the polyurethane for use in accordance with the invention in such a way that the aqueous dispersions run the whole gamut of salvation between molecularly disperse solution of the polyurethanes and stabilized powder slurry particles.

Preferably, these solid, finely divided particles have an average size of from 3.0 to 10 µm, in particular from 3.0 to 5 µm.

Viewed in terms of its method, the preparation of the polyurethane dispersion of the invention from the starting materials described above has no special features but instead takes place in accordance with the customary and known methods of preparing aqueous polyurethane dispersions, as described, for example, in the patents cited at the outset that relate to aqueous basecoats.

In accordance with the invention it is of advantage to synthesize the polyurethane of the invention by means of the preparation process of the invention.

For example, in one preferred variant of the preparation process of the invention, at least one compound (B) is reacted in a first process step with a molar excess of at least one compound (A) to give an adduct containing free isocyanate groups and bonds that may be activated with actinic radiation. In a second process step, the adduct is reacted with at least one compound (D) and, if desired, (C) to give a prepolymer containing isocyanate groups. In a further process step, at least one neutralizing agent (E) and, if desired, at least one compound (C) are added, to give a partially or fully neutralized prepolymer. In a fourth process step, the neutralized prepolymer is reacted with a compound (F). If any free isocyanate groups are still present, they are reacted preferably with at least one compound (G) and/or (C), so giving the polyurethane for use in accordance with the invention. In addition to the compounds (G) and/or (C), it is possible to use the blocking agents known from U.S. Pat. No. 4,444,954 A. In one further variant of the preparation process of the invention, the starting materials may be reacted with one another in a one-pot process.

The polyurethane of the invention is subsequently transferred to an aqueous medium, so giving the polyurethane dispersion of the invention.

The aqueous medium comprises essentially water. The aqueous medium may include minor amounts of organic solvents, reactive diluents curable with actinic radiation, photoinitiators, free-radical polymerization initiators, and/or other customary coatings additives and/or other dissolved solid, liquid or gaseous, organic and/or inorganic, low and/or high molecular mass substances. In the context of the present invention, a "minor amount" is an amount which does not change the aqueous nature of the aqueous medium. However, the aqueous medium may also comprise water alone.

The resultant dispersion of the invention may be self-crosslinking in the sense referred to at the outset.

The dispersion of the invention is used to prepare the coating materials, adhesives, and sealing compounds of the invention.

Particular advantages result if the polyurethane dispersion of the invention is used to prepare the coating materials of the invention. The comment [sic] below, however, apply mutatis mutandis to the adhesives and sealing compounds of the invention as well.

The coating materials of the invention may comprise pigmented or unpigmented coating materials. Examples of pigmented coating materials are surfacers, aqueous basecoats, and solid-color topcoats. Examples of unpigmented coating materials are clearcoats, especially powder slurry clearcoats.

The amount of the dispersion of the invention in the coating materials of the invention may vary widely and is guided is guided [sic] in particular by the end use, by the amount of polymers in the dispersion of the invention, and by the other constituents present, in particular by whether a crosslinking agent is used or not. The amount is preferably from 10 to 100, more preferably from 20 to 99, with particular preference from 30 to 99, with very particular preference from 40 to 99, and in particular from 50 to 99% by weight, based in each case on the total amount of the coating material.

Preferably, the coating materials of the invention include at least one crosslinking agent containing on average per molecule at least one carbamate-reactive functional group and, if desired, at least one of the above-described bonds that may be activated with actinic radiation.

Examples of suitable carbamate-reactive functional groups are N-methylol groups and N-methylol ether groups.

Preference is given to the use of amino resins. Examples of highly suitable amino resins are melamine resins, guanamine resins, and urea resins. In this context it is possible to use any amino resin that is suitable for transparent topcoats or clearcoats, or a mixture of such amino resins. For further details, reference is made to Römpp, op. cit., page 29, "Amino resins", the textbook "Lackadditive" [Coatings additives] by Johan Bieleman, Wiley-VCH, Weinheim, N.Y., 1998, pages 242 et seq., and the book "Paints, coatings and solvents", second, completely revised edition, eds. D. Stoye and W. Freitag, Wiley-VCH, Weinheim, N.Y., 1998, pages 80 ff. Also suitable are the customary and known amino resins some of whose methylol and/or methoxymethyl groups have been defunctionalized by means of carbamate or allophanate groups. Crosslinking agents of this kind are described in U.S. Pat. No. 4,710,542 A and EP 0 245 700 B1 and in the article by B. Singh and coworkers, "Carbamylmethylated melamines, novel crosslinkers for the coatings industry" in Advanced Organic Coatings Science and Technology Series, 1991, Volume 13, pages 193 to 207.

The amount of the crosslinking agent in the coating material of the invention may vary widely and is guided in particular by its functionality, by the end use, and by the other constituents present. Preferably, the amount of crosslinking agent is from 0.1 to 90, more preferably from 0.5 to 80, with particular preference from 0.8 to 70, with very particular preference from 1.0 to 60, and in particular from 1.5 to 50% by weight, based in each case on the total amount of the coating material.

The coating material of the invention may further comprise at least one additive.

The selection is guided in particular by the intended use of the dual-cure composition of the invention. Preferably, these additives are not volatile under the processing and application conditions of the coating material of the invention and are not broken down by water.

Where the coating material of the invention is used as a surfacer, topcoat or basecoat, its additives include color and/or effect pigments in conventional amounts. The pigments may comprise organic or inorganic compounds and may be effect and/or color pigments. On the basis of this large number of suitable pigments, therefore, the dual-cure coating material of the invention assures a universal scope of application and permits the realization of a large number of color shades and optical effects.

Effect pigments which may be used include metal flake pigments such as standard commercial aluminum bronzes, aluminum bronzes chromated in accordance with DE 36 36 183 A1, and standard commercial stainless steel bronzes, and also nonmetallic effect pigments, such as pearlescent pigments and interference pigments, for example. For further details, reference is made to Römpp, op. cit., pages [sic] 176, "Effect pigments" and pages 380 and 381, "Metal oxide-mica pigments" to "Metal pigments".

Examples of suitable inorganic color pigments are titanium dioxide, iron oxide, Sicotrans yellow, and carbon black. Examples of suitable organic color pigments are thioindigo pigments, indanthrene blue, Cromophthal red, Irganzine orange, and Heliogen green. For further details, reference is made to Römpp, op. cit., pages 180 and 181, "Iron-blue pigments" to "Black iron oxide", pages 451 to 453, "Pigments" to "Pigment volume concentration", page 563, "Thioindigo pigments", and page 567, "Titanium dioxide pigments".

Furthermore, the dual-cure coating material of the invention, especially as a surfacer, may comprise organic and inorganic fillers in conventional, effective amounts. Examples of suitable fillers are chalk, calcium sulfate, barium sulfate, silicates such as talc or kaolin, silicas, oxides such as aluminum hydroxide or magnesium hydroxide, and organic fillers such as textile fibers, cellulose fibers, polyethylene fibers or wood flour. For further details, reference is made to Römpp, op. cit., pages 250 ff., "Fillers".

These pigments and fillers may also be incorporated into the dual-cure coating materials of the invention by way of pigment pastes.

The above-described pigments and fillers are omitted if the coating materials of the invention are used in their especially preferred utility as clearcoats.

Examples of suitable additives which may be present in the clearcoats, surfacers, basecoats, and topcoats of the invention are

- customary and known oligomeric and polymeric binders such as thermally curable, linear and/or branched and/or block, comb and/or random poly(methyl)acrylates or acrylate copolymers, polyesters, alkyds, polyurethanes, acrylated polyurethanes, acrylated polyesters, polylactones, polycarbonates, polyethers, epoxy resin-amine adducts, (meth)acrylatediols, partially hydrolyzed polyvinyl esters, or polyureas;
- customary and known reactive diluents curable thermally and/or with actinic radiation, such as positionally isomeric diethyloctanediols or hydroxyl-containing hyperbranched compounds or dendrimers, difunctional or higher polyfunctional (meth)acrylates such as trimethylolpropane tri(meth)acrylate, or polyisocyanates containing (meth)acrylate groups;
- additional crosslinking agents such as resins or compounds containing anhydride groups, resins or compounds containing epoxide groups, tris(alkoxycarbonylamino)triazines, resins or compounds containing carbonate groups, blocked and/or unblocked polyisocyanates, betahydroxyalkylamides, and compounds containing on average at least two groups capable of transesterification, examples being reaction products of malonic diesters and polyisocyanates or of esters and partial esters of polyhydric alcohols of malonic acid with monoisocyanates, as described in European Patent EP 0 596 460 A1;
- low-boiling and/or high-boiling organic solvents ("long solvents");
- UV absorbers and/or other light stabilizers such as benzotriazoles or oxalanilides or free-radical scavengers such as HALS compounds;
- photoinitiators such as those of the Norrish II type, whose mechanism of action is based on an intramolecular variant of the hydrogen abstraction reactions as occur diversely in the context of photochemical reactions (reference may be made here by way of example to Römpp Chemie Lexikon, 9th, expanded and revised edition, Georg Thieme Verlag, Stuttgart, Vol. 4, 1991), or cationic photoinitiators (reference may be made here by way of example to Römpp Lexikon Lacke und Druckfarben, Georg Thieme Verlag, Stuttgart, 1998, pages 444 to 446), especially benzophenones, benzoins or benzoin ethers, or phosphine oxides;
- thermally labile free-radical initiators such as organic peroxides, organic azo compounds or C—C-cleaving initiators such as dialkyl peroxides, peroxocarboxylic acids, peroxodicarbonates, peroxide esters, hydroperoxides, ketone peroxides, azo dinitriles, or benzpinacol silyl ethers;
- crosslinking catalysts such as dibutyltin dilaurate, lithium decanoate or zinc octoate or strong acids such as organic sulfonic acids, which may have been blocked with amines;
- devolatilizers, such as diazadicycloundecane;
- slip additives;
- polymerization inhibitors;
- defoamers;
- emulsifiers, especially nonionic emulsifiers such as alkoxylated alkanols, polyols, phenols and alkylphenols, or anionic emulsifiers such as alkali metal salts or ammonium salts of alkanecarboxylic acids, alkanesulfonic acids, and sulfo acids of alkoxylated alkanols, polyols, phenols and alkylphenols;
- wetting agents such as siloxanes, fluorine compounds, carboxylic monoesters, phosphoric esters, polyacrylic acids and their copolymers, or polyurethanes;
- adhesion promoters such as tricyclodecanedimethanol;
- leveling agents;
- film-forming auxiliaries such as cellulose derivatives;
- transparent fillers based on silicon dioxide, aluminum oxide or zirconium oxide; for further details, reference is made to Römpp Lexikon Lacke und Druckfarben, Georg Thieme Verlag, Stuttgart, 1998, pages 250 to 252;
- rheology control additives, such as those known from Patents WO 94/22968, EP 0 276 501 A1, EP 0 249 201 A1, and WO 97/12945; crosslinked polymeric microparticles, as disclosed, for example, in EP 0 008 127 A; inorganic phyllosilicates such as aluminum-magnesium silicates, sodium-magnesium and sodium-magnesium-fluorine-lithium phyllosilicates of the montmorillonite type; silicas such as aerosils; or synthetic polymers containing ionic and/or associative groups, such as polyvinyl alcohol, poly(meth)acrylamide, poly(meth)acrylic acid, polyvinylpyrrolidone, styrene-maleic anhydride or ethylene-maleic anhydride copolymers and their derivatives, or hydrophobically modified, ethoxylated urethanes or polyacrylates;
- flame retardants, and/or
- flatting agents such as magnesium stearate.

Further examples of suitable additives are described in the textbook "Lackadditive" by Johan Bielemann, Wiley-VCH, Weinheim, N.Y., 1998.

The above-described additives may also be present in the adhesives and sealing compounds of the invention, provided they are suitable for these purposes, something which the skilled worker may readily determine on the basis of his or her general knowledge of the art.

The preparation of the coating materials, adhesives, and sealing compounds of the invention has no special features but instead takes place in customary and known manner by mixing of the above-described constituents in suitable mixing equipment such as stirred vessels, dissolvers, stirred mills or extruders in accordance with the processes suitable for preparing the respective coating materials, adhesives, and sealing compounds of the invention.

The adhesives of the invention are used to produce the adhesive films of the invention on primed and unprimed substrates.

The sealing compounds of the invention are used to produce the seals of the invention on and/or in primed and unprimed substrates.

The coating materials of the invention are used in particular to produce single-coat or multicoat clearcoats and/or multicoat color and/or effect systems on primed and unprimed substrates. The coating materials of the invention are found particularly advantageous in these utilities. Very particular advantages result in the case of their use to produce clearcoats, especially as part of the so-called wet-on-wet technique, in which a basecoat material, especially an aqueous basecoat material, is applied to the primed or unprimed substrate and dried, but not cured, after which a clearcoat material of the invention, especially a powder slurry clearcoat of the invention, is applied to the basecoat film and the resultant clearcoat film is cured together with the basecoat film, thermally and with actinic radiation.

Suitable substrates include all surfaces to be coated which are undamaged by curing of the films present thereon using a combination of heat and actinic radiation.

Suitable substrates comprise metals, plastics, wood, ceramic, stone, textile, fiber composites, leather, glass, glass fibers, glass wool, rock wool, mineral- and resin-bound building materials, such as plasterboards and cement slabs or roof tiles, and assemblies of these materials.

Accordingly, the coatings, adhesive films or seals of the invention are also suitable for applications outside of automotive OEM finishing and refinishing. They are especially suitable for the coating, bonding and/or sealing of furniture, windows and doors, of interior and exterior constructions, and for industrial coating, including coil coating, container coating, and the impregnation or coating of electrical components. In the context of industrial coating, they are suitable for the coating, bonding and/or sealing of virtually all parts for private or industrial use, such as radiators, domestic appliances, small metal parts such as nuts and bolts, wheel caps, rims, packaging, or electrical components such as motor windings or transformer windings.

In the case of electrically conductive substrates it is possible to use primers, which are produced in a customary and known manner from electrodeposition coating materials. Suitable for this purpose are both anodic and cathodic electrodeposition coating materials, but especially cathodics.

It is also possible to coat, bond or seal primed or unprimed plastics parts made, for example, of ABS, AMMA, ASA, CA, CAB, EP, UF, CF, MF, MPF, PF, PAN, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM and UP (abbreviations to DIN 7728P1). Unfunctionalized and/or nonpolar substrate surfaces may be subjected to a conventional pretreatment prior to coating, such as with a plasma or by flaming, or may be provided with a water-based primer.

The coating materials, adhesives, and sealing compounds of the invention, especially the coating materials of the invention, may be applied by all customary application methods, such as spraying, knife coating, brushing, flow coating, dipping, impregnating, trickling, or rolling, for example. The substrate to be coated may itself be at rest, with the application device or unit being moved. Alternatively, the substrate to be coated, especially a coil, may be moved, with the application unit being at rest relative to the substrate or being moved appropriately.

Preference is given to the use of spray application methods, such as compressed air spraying, airless spraying, high-speed rotation, electrostatic spray application (ESTA), alone or in conjunction with hot spray applications such as hot air spraying, for example. Application may be carried out at temperatures of max. 70 to 80° C., so that appropriate application viscosities are obtained without the brief thermal load entailing any alteration or damage to the coating material and its overspray, which may be intended for reprocessing. For instance, hot spraying may be configured such that the coating material is heated only very briefly in the spray nozzle or a short way upstream of the spray nozzle.

The spray booth used for the application may be operated, for example, with an optionally temperature-controllable circulation system, which is operated with an appropriate absorption medium for the overspray, an example being the coating material itself.

Application is preferably made under illumination with visible light with a wavelength of more than 550 nm, or in the absence of light. This prevents material alteration or damage to the coating material of the invention and the overspray.

In general, the surfacer film, topcoat film, basecoat film, and clearcoat film are applied in a wet-film thickness such that after the films have been cured they give coats having the coat thicknesses which are advantageous and necessary for their functions. In the case of the surfacer film this thickness is from 10 to 150, preferably from 15 to 120, with particular preference from 20 to 100, and in particular from 25 to 90 μm; in the case of the topcoat it is from 5 to 90, preferably from 10 to 80, with particular preference from 15 to 60, and in particular from 20 to 50 μm; in the case of the basecoat it is from 5 to 50, preferably from 10 to 40, with particular preference from 12 to 30, and in particular from 15 to 25 μm; and in the case of the clearcoats it is from 10 to 100, preferably from 15 to 80, with particular preference from 20 to 70, and in particular from 25 to 60 μm.

Curing may take place after a certain rest period. This period may have a duration of from 30 s to 2 h, preferably from 1 min to 1 h, and in particular from 1 min to 30 min. The rest period serves, for example, for the leveling and devolatilization of the applied films or for the evaporation of volatile constituents such as solvent or water. The rest period may be shortened and/or assisted by the application of elevated temperatures of up to 80° C., provided this does not entail any damage or alteration to the applied films, such as premature complete crosslinking.

In accordance with the invention, curing takes place with actinic radiation, in particular with UV radiation, and/or with electron beams. If desired, it may be conducted or supplemented with actinic radiation from other sources. In the case of electron beams, it is preferred to operate under an inert gas atmosphere. This may be ensured, for example, by supplying carbon dioxide and/or nitrogen directly to the surface of the applied films.

In the case of UV radiation curing as well it is possible to operate under inert gas, so as to prevent the formation of ozone.

Actinic radiation curing is carried out using the customary and known radiation sources and optical auxiliary measures. Examples of suitable radiation sources are high-pressure or low-pressure mercury vapor lamps, with or without lead doping in order to open up a radiation window of up to 405 nm, or electron beam sources. The arrangement of these sources is known in principle and may be adapted to the circumstances of the workpiece and the process parameters. In the case of workpieces of complex shape such as automobile bodies, those areas not accessible to direct radiation (shadow regions), such as cavities, folds and other structural undercuts, may be cured using point, small-area or all-round emitters, in conjunction with an automatic movement device for the irradiation of cavities or edges.

The equipment and conditions for these curing methods are described, for example, in R. Holmes, U.V. and E.B. Curing Formulations for Printing Inks, Coatings and Paints, SITA Technology, Academic Press, London, United Kingdom, 1984.

Curing here may take place in stages, i.e., by multiple exposure to light or to actinic radiation. It may also take place alternatingly, i.e., by curing alternately with UV radiation and electron beams.

The thermal curing as well has no special features in terms of its method but instead takes place in accordance with the customary and known methods such as heating in a convection oven or irradiation with IR lamps. As with the actinic radiation curing, the thermal curing may take place in stages. The thermal curing advantageously takes place at a temperature >90° C., preferably from 90 to 180° C., with particular preference from 110 to 160° C., and in particular from 120 to 150° C., for a time of from 1 min to 2 h, with particular preference from 2 min to 1 h, and in particular from 3 min to 30 min.

Thermal curing and actinic radiation curing may be used simultaneously or in alternation. If the two curing methods are used in alternation, it is possible, for example, to commence with heat curing and end with actinic radiation curing. In other cases it may prove advantageous to commence and to end with actinic radiation curing. The skilled worker is able to determine the curing method most advantageous for the particular case on the basis of his or her general knowledge in the art, possibly with the aid of simple preliminary experiments.

The adhesive films and seals of the invention produced from the dual-cure adhesives and dual-cure sealing compounds of the invention have an outstanding bond strength and sealing capacity, even over long periods, and even under extremely and/or rapidly changing climatic conditions.

The coatings of the invention produced from the coating materials of the invention possess excellent leveling and have an outstanding overall visual appearance. They are stable to weathering and do not yellow even in a tropical climate. They can therefore be used in the interior and the exterior sector.

The multicoat color and/or effect systems produced with the aid of the coating process of the invention are of the utmost optical quality as regards color, effect, gloss, and DOI (distinctiveness of the reflected image), have a smooth, unstructured, hard, flexible, and scratch-resistant surface, are weathering-stable, chemical-resistant and etch-resistant, do not yellow, and show no cracking or delamination of the coats.

As a result, the primed and unprimed substrates of the invention, especially bodies of automobiles and commercial vehicles, industrial components, including plastics parts, packaging, coils, and electrical components, or furniture, which have been coated with at least one coating of the invention, sealed with at least one seal of the invention, and/or bonded with at least one adhesive of the invention, also exhibit special technical and economic advantages, in particular a long service life, so making them particularly attractive to users.

EXAMPLES

Preparation Example 1

The Preparation of an Allophanate from Hexamethylene Diisocyanate and 2-hydroxyethyl Acrylate The allophanate was prepared as in German Patent DE-A-198 60 041, Experimental Section 1.1, Product No. 6. For this purpose, hexamethylene diisocyanate was mixed under nitrogen blanketing with 40 mol % (based on the isocyanate) of 2-hydroxyethyl acrylate and the mixture was heated to 80° C. Following the addition of 200 ppm by weight (based on the isocyanate) of N,N,N-trimethyl-N-(2-hydroxypropyl)-ammonium 2-ethylhexanoate, the reaction mixture was heated slowly to 120° C. and held at this reaction temperature. When the isocyanate content of the reaction mixture was 13.5% by weight, the reaction was stopped by adding 250 ppm by weight (based on the isocyanate) of di(2-ethylhexyl) phosphate. The reaction mixture was then freed from unreacted hexamethylene diisocyanate in a thin-film evaporator at 135° C. and 2.5 mbar. After distillation, the resultant allophanate had an isocyanate content of 13.5% by weight and a viscosity of 810 mPas at 23° C.

Example 1

The Preparation of the Inventive Polyurethane Dispersion 1

In a stirred vessel, 335 parts by weight of the allophanate of Preparation Example 1 were reacted in the stated sequence with 30 parts by weight of hydroxypropyl carbamate, 50 parts by weight of cyclohexanedimethanol, 8 parts by weight of hydroxy acetic acid and, for blocking of the excess isocyanate groups, with 12 parts by weight of n-butanol. The resultant polyurethane had an acid number of 8.5 mg KOH/g. It was neutralized with 11 parts by weight of triethylamine. The neutralized polyurethane was dispersed in water to give a solids content of 43% by weight (1 h/130° C.).

Example 2

The Preparation of the Inventive Polyurethane Dispersion 2

Example 1 was repeated except that 376 parts by weight of a commercial isocyanurate of hexamethylene diisocyanate (Desmodur® N 3300 from Bayer AG) were used instead of the allophanate of Preparation Example 1.

Examples 3 to 6

The Preparation of the Inventive Clearcoats 3 to 6

The inventive clearcoats 3 to 6 were prepared by mixing the constituents listed in Table 1 in a dissolver (rotary speed: 3000 rpm; disk diameter: 3 cm; duration: 30 min). In the case of Examples 5 and 6, the amino resin and the catalyst were mixed beforehand and then stirred as a premix into the dispersion.

TABLE 1

The material composition of the inventive clearcoats of Examples 3 to 6

| Constituent | Parts by weight: Example | | | |
|---|---|---|---|---|
| | 3 | 4 | 5 | 6 |
| Polyurethane dispersion 1 | 100 | — | 100 | — |
| Polyurethane dispersion 2 | — | 100 | — | 100 |
| Byk ® 348[a)] | 0.4 | 0.4 | 0.4 | 0.4 |
| Irgacure ® 184[b)] | 2.7 | 2.7 | 2.7 | 2.7 |

TABLE 1-continued

The material composition of the inventive
clearcoats of Examples 3 to 6

| Constituent | Parts by weight: Example | | | |
|---|---|---|---|---|
| | 3 | 4 | 5 | 6 |
| Cymel ® 325[c] | — | — | 3 | 3 |
| catalyst[d] | — | — | 0.06 | 0.06 |

[a] Polyether-modified polydimethylsiloxane from Byk
[b] 1-Hydroxycyclohexyl phenyl ketone, 50% strength in Texanol/isopropanol 1:2 (Ciba Additives)
[c] Commercial amino resin from Cytec
[d] Amine-blocked benzenesulfonic acid (Nacure ® 2500 from King Industries)

The clearcoats of Examples 3 and 4 are thermally self-crosslinking clearcoats.

The clearcoats of Examples 5 and 6 are thermally externally crosslinking clearcoats.

Examples 7 to 10

The Preparation of the Inventive Multicoat Color Systems 7 to 10

Clearcoat 3 was used for Example 7, clearcoat 4 for Example 8, clearcoat 5 for Example 9, and clearcoat 6 for Example 10.

A commercial aqueous surfacer (Ecoprime® R130 from BASF Coatings AG), first of all, was applied using a gravity-feed gun to steel panels coated (electrodeposition coating with a coat thickness of 18-22 µm) cathodically with a commercial electrodeposition coating material (Cathoguard® 500 from BASF Coatings AG), and the panels were baked. This gave a surfacer coating having a coat thickness of from 35 to 40 µm. Subsequently, in the same way, a black aqueous basecoat (Basislack nachtschwarz FV96-9400 from BASF Coatings AG) was applied to the surfacer and dried at 80° C. for 10 minutes. After the panels had cooled, in each case in each case [sic] one film of clearcoats 3 to 6 was applied in a wet-film thickness of 150 µm, using a gravity-feed gun, and each film was flashed off at room temperature for 10 minutes and dried at room temperature for 2 minutes (wet-on-wet technique).

Subsequently, the test panels were exposed to UV radiation with a dose of 1500 mJ/cm². They were subsequently baked at 150° C. for 30 minutes (dual cure). This gave a basecoat having a dry thickness of 16 µm and a clearcoat having a dry thickness of 45 µm.

The scratch resistance was determined in accordance with the sand test. For this purpose, the film surfaces were stressed with sand (20 g of quartz silver sand, 1.5-2.0 mm). The sand was placed in beakers (cut off plane at the bottom) which were fastened securely to the test panels of Examples 7 to 10. By means of a motor drive, the test panels with the beakers and the sand were set in shaking movement. The movement of the loose sand caused damage to the film surfaces (100 double strokes in 20 s). Following sand exposure, the test areas were cleaned of the abraded material, wiped down carefully under a jet of cold water, and then dried using compressed air. The gloss to DIN 67530 was measured before and after damage (measurement direction perpendicular to the direction of scratching). Table 2 gives an overview of the results obtained.

TABLE 2

Scratch resistance of the inventive multicoat
systems 7 to 10 by the sand test

| Gloss to DIN 67530 | Examples: | | | |
|---|---|---|---|---|
| | 7 | 8 | 9 | 10 |
| Initial: | 81.6 | 82.6 | 81 | 83.4 |
| After damage: | 27.7 | 43.9 | 60.6 | 76.7 |
| 2 h at 40° C.: | 27.4 | 30.4 | 64.6 | 76.7 |
| 2 h at 60° C.: | 29.8 | 40.3 | 64.6 | 78.1 |

The sand test underscored the high scratch resistance of the inventive multicoat systems of Examples 9 and 10. The multicoat systems produced from the thermally self-crosslinking clearcoats 3 and 4 do not fully attain the high level.

Examples 11 to 14

The Production of the Inventive Clearcoats 11 to 14

Clearcoat 3 was used for Example 11, clearcoat 4 for Example 12, clearcoat 5 for Example 13, and clearcoat 6 for Example 14.

For Examples 11 to 14, the clearcoats 3 to 6 were applied to test panels as normally used to measure the micropenetration hardness. The curing conditions employed were the same as those for Examples 7 to 10. The dry-film thickness of the inventive clearcoats 11 to 14 was 45 µm.

The results summarized in Table 3 demonstrate the good mechanical stability of the clearcoats 11 and 12 produced from the thermally self-crosslinking clearcoats 3 and 4. The level was significantly increased further by the use of crosslinking agents (cf. Examples 13 and 14).

TABLE 3

Micropenetration hardness and creep at
25.6 mN of the clearcoats 11 to 14

| Examples | Parameter: | | | | | |
|---|---|---|---|---|---|---|
| | I | II | III | IV | V | VI |
| 11 | 126.4 | 10.2 | 2.77 | 41.5 | 20 | −36 |
| 12 | 137.8 | 14.4 | 2.66 | 37.8 | 18.4 | −35.6 |
| 13 | 161.9 | 11.7 | 2.45 | 47.3 | 11.8 | −21.4 |
| 14 | 163.4 | 1.7 | 2.43 | 49.2 | 8.2 | −23.2 |

I Universal hardness at 25.6 mN (N/mm²)
II Standard deviation of the universal hardness
III Average penetration depth (µm)
IV Relative elastic resilience (%)
V Creep at 25.6 mN (%)
VI Creep at 0.4 mN (%)

Examples 15 to 18

The Production of the Inventive Clearcoats 15 to 18

The clearcoat 3 was used for Example 15, clearcoat 4 for Example 16, clearcoat 5 for Example 17, and clearcoat 6 for Example 18.

For Examples 15 to 18, the clearcoats 3 to 6 were applied to steel panels with white basecoats. The curing conditions employed were the same as those for Examples 7 to 10. The dry-film thickness of the inventive clearcoats 11 to 14 was 45 µm.

Table 4 gives an overview of the tendency of the clearcoats 11 to 14 to yellow. The yellowing resistance was found by calorimetric determination of the yellow value by the Cielab method. The results demonstrate the high yellowing resistance.

TABLE 4

The yellowing resistance of the inventive
clearcoats in accordance with determination
of the yellow value by the Cielab method

| Examples | Initial: | | | After one week: | | |
|---|---|---|---|---|---|---|
| | L* | a* | b* | L* | a* | b* |
| 15 | 89.0 | −2.2 | 2.6 | 88.4 | −2.1 | 2.5 |
| 16 | 88.8 | −2.1 | 4.8 | 88.7 | −2.3 | 3.6 |
| 17 | 87.9 | −2.3 | 3.6 | 87.8 | −2.3 | 3.6 |
| 18 | 88.7 | −2.0 | 3.4 | 88.7 | −2.0 | 3.2 |

What is claimed is:

1. A dual cure aqueous dispersion comprising at least one polyurethane polymer, the polyurethane polymer comprising on average:
   (i) at least one primary carbamate group;
   (ii) more than five groups that are at least one of a methacrylate group, an acrylate group, or a mixture thereof; and
   (iii) at least one dispersive ionic functional group;
   wherein the dual cure aqueous dispersion cures via the application of both heat and actinic radiation and further wherein the at least one primary carbamate group is separated from all of the groups of (ii) by at least 8 chemical bonds prior to curing; and
   wherein the polyurethane polymer is prepared by a process comprising reacting:
   (A) at least one aliphatic polyisocyanate having an isocyanate functionality of from 2.0 to 6.0;
   (B) at least one compound comprising at least one isocyanate-reactive functional group and at least one of a methacrylate group, an acrylate group, or a mixture thereof;
   (C) at least one low molecular weight aliphatic compound comprising a plurality of isocyanate-reactive functional groups;
   (D) at least one compound comprising at least one isocyanate-reactive functional group and at least one dispersive potentially ionic, functional group;
   (E) at least one neutralizing agent for the dispersive potentially ionic functional groups of the compound (D); and
   (F) at least one compound comprising:
      I. at least one of:
         i. a primary carbamate group; and
         ii. at least one cyclic ethylene carbonate group; and
      II. at least one isocyanate-reactive group; and
   (G) optionally, at least one compound comprising an isocyanate-reactive functional group, other than the compounds (B) to (F),
   wherein said groups (i), (ii), and (iii) in said polyurethane polymer correspond to groups in the reactant compounds (F), (B), and (D), respectively, and wherein the isocyanate-reactive groups in compounds (B), (C), (D), and (F) form urethane linkages in the polyurethane polymer.

2. The aqueous dispersion of claim 1, wherein the at least one dispersive ionic functional group is present in an amount to give, based on the solids of the dispersion, an acid number or amine number of from 3.0 to 100 mg KOH/g.

3. The aqueous dispersion of claim 1, wherein the at least one dispersive ionic functional group is an anionic group.

4. The aqueous dispersion of claim 1, wherein the degree of neutralization of the at least one dispersive ionic functional group is at least 60 mol %.

5. The aqueous dispersion of claim 4, wherein the degree of neutralization is at least 95 mol %.

6. The aqueous dispersion of claim 1, wherein the polymer comprises on average at least two carbamate groups.

7. The aqueous dispersion of claim 1, wherein the polymer further comprises (iv) at least one isocyanate-reactive functional group.

8. The aqueous dispersion of claim 7, wherein the at least one isocyanate-reactive functional group is at least one of a thiol group, a hydroxyl group, a primary amino group, and a secondary amino group.

9. The aqueous dispersion of claim 1, wherein the at least one dispersive anionic functional group is at least one of a carboxylate group, a sulfonate group, and a phosphonate group.

10. The aqueous dispersion of claim 1, wherein the at least one aliphatic polyisocyanate comprises an aliphatic polyisocyanate comprising at least one of an isocyanurate group, a biuret group, an allophanate group, an iminooxadiazinedione group, a urethane group, a urea group, a carbodiimide group, and a uretdione group.

11. The aqueous dispersion of claim 10, wherein the at least one aliphatic polyisocyanate comprises a hexamethylene diisocyanate that comprises at least one of an allophanate group and an isocyanurate group.

12. The aqueous dispersion of claim 1, wherein the at least one compound (B) at least one of a hydroxyalkyl ester of (meth)acrylic acid, a hydroxycycloalkyl ester of (meth)acrylic acid, a reaction product of a cyclic ester and a hydroxyalkyl ester of (meth)acrylic acid, or a reaction product of a cyclic ester and a hydroxycycloalkyl ester of (meth)acrylic acid.

13. The aqueous dispersion of claim 1, wherein the at least one low molecular mass aliphatic compound comprising a plurality of isocyanate-reactive functional groups comprises at least one of a polyol, a polyamine, polyol amine, and polyamino alcohol.

14. The aqueous dispersion of claim 1, wherein the at least one compound comprising at least one isocyanate-reactive functional group and at least one dispersive potentially ionic, functional group is at least one of a mercapto-carboxylic acid, a mercaptophosphonic acid, a mercaptosulfonic acid, a hydroxy-carboxylic acid, a hydroxyphosphonic acid, a hydroxysulfonic acid, an aminocarboxylic acid, an aminophosphonic acid, an aminosulfonic acid, an iminocarboxylic acid, an iminophosphonic acid, and an iminosulfonic acid.

15. The aqueous dispersion of claim 1, wherein the at least one neutralizing agent comprises an organic amine.

16. The aqueous dispersion of claim 1, wherein the compounds (F) comprise a hydroxyalkyl carbamate.

17. The aqueous dispersion of claim 1, wherein the compound (G) comprises at least one of an alcohol and a monoamine.

18. A method comprising applying the aqueous dispersion of claim 1 to at least one of on and in a substrate and forming one of an at least one coating, an adhesive, and a sealant.

19. The method of claim 18, wherein the at least one coating is one of a single-coat clearcoat, a multicoat clearcoat, and a coating system that is at least one of color and effect.

20. The method of claim 18, wherein the at least one coating is at least one of a surfacer, a solid-color topcoat, a basecoat, and a clearcoat.

21. A composition comprising at least one dispersion of claim 1, wherein the composition is one of a coating material, an adhesive, and a sealing compound.

22. The composition of claim 21 further comprising at least one crosslinking agent comprising at least one amino resin.

23. The dual cure aqueous dispersion of claim 1 wherein the heat and actinic radiation are used in alternation.

24. A dual cure aqueous dispersion comprising at least one polyurethane polymer, the polyurethane polymer comprising on average:
(i) at least one primary carbamate group;
(ii) more than five groups that are at least one of a methacrylate group, an acrylate group, or a mixture thereof; and
(iii) at least one dispersive ionic functional group;
wherein the dual cure aqueous dispersion cures via the application of both heat and actinic radiation and further wherein the at least one primary carbamate group is separated from all of the groups of (ii) by at least 8 chemical bonds prior to curing; and
wherein the polyurethane polymer is prepared by a process comprising reacting:
(A) at least one aliphatic polyisocyanate (A) having an isocyanate functionality of from 2.0 to 6.0 and comprising at least one of an isocyanurate group, a biuret group, an allophanate group, an iminooxadiazinedione group, a urethane group, a urea group, a carbodiimide group, and a uretdione group;
(B) at least one compound (B) comprising at least one isocyanate-reactive functional group and at least one of a methacrylate group, an acrylate group, or a mixture thereof, wherein compound (B) comprises at least one of a hydroxyalkyl ester of methacrylic acid or acrylic acid, a hydroxycycloalkyl ester of methacrylic acid or acrylic acid, a reaction product of a cyclic ester and a hydroxyalkyl ester of methacrylic acid or acrylic acid, or a reaction product of a cyclic ester and a hydroxycycloalkyl ester of methacrylic acid or acrylic acid, wherein compound (B) is reacted in a first process step with a molar excess of compound (A) to give an adduct containing free isocyanate groups and bonds that may be activated with actinic radiation;
(C) at least one low molecular weight aliphatic compound (C) comprising a plurality of isocyanate-reactive functional groups, which compound (C) is at least one of a polyol, a polyamine, and an amino alcohol;
(D) at least one compound (D) comprising at least one isocyanate-reactive functional group and at least one dispersive potentially ionic, functional group, which compound (D) is at least one of a mercaptocarboxylic acid, a mercaptophosphonic acid, a mercaptosulfonic acid, a hydroxy-carboxylic acid, a hydroxyphosphonic acid, a hydroxysulfonic acid, an aminocarboxylic acid, an aminophosphonic acid, an aminosulfonic acid, an iminocarboxylic acid, an iminophosphonic acid, and an iminosulfonic acid;
(E) at least one neutralizing agent (E) for the dispersive potentially ionic functional groups of the compound (D); and
(F) at least one compound (F) comprising:
I. at least one of:
  i. a primary carbamate group; and
  ii. at least one cyclic ethylene carbonate group; and
II. at least one isocyanate-reactive group; and
(G) optionally, at least one compound (G) comprising an isocyanate-reactive functional group, other than the compounds (B) to (F),
wherein said groups (i), (ii), and (iii) in said polyurethane polymer correspond to groups in the reactant compounds (F), (B), and (D), respectively, and wherein the isocyanate-reactive groups in compounds (B), (C), (D), and (F) form urethane linkages in the polyurethane polymer, with the proviso that the polyurethane polymer does not comprise silicon-carbon bonds.

25. The aqueous dispersion of claim 24 further comprising an amino resin.

26. A dual cure aqueous dispersion comprising at least one polyurethane polymer, the polyurethane polymer comprising on average the following groups:
(i) at least one primary carbamate group;
(ii) more than five groups that are at least one of a methacrylate group, an acrylate group, or a mixture thereof; and
(iii) at least one dispersive ionic functional group;
wherein the dual cure aqueous dispersion cures via the application of both heat and actinic radiation and further wherein the at least one primary carbamate group is separated from all of the groups of (ii) by at least 8 chemical bonds prior to curing;
wherein the polyurethane polymer is prepared by a process comprising reacting the following reactant compounds:
(A) at least one aliphatic polyisocyanate having an isocyanate functionality of from 2.0 to 6.0;
(B) at least one compound comprising at least one isocyanate-reactive functional group and at least one of a methacrylate group, an acrylate group, or a mixture thereof;
(C) at least one low molecular weight aliphatic compound comprising a plurality of isocyanate-reactive functional groups;
(D) at least one compound comprising at least one isocyanate-reactive functional group and at least one dispersive potentially ionic, functional group;
(E) at least one neutralizing agent for the dispersive potentially ionic functional groups of the compound (D); and
(F) at least one compound comprising:
I. at least one of:
  i. a carbamate group that is at least one of primary and secondary; and
  ii. at least one cyclic ethylene carbonate group; and
II. at least one isocyanate-reactive group; and
(G) optionally, at least one compound comprising an isocyanate-reactive functional group, other than the compounds (B) to (F); and
wherein said groups (i), (ii), and (iii) in said polyurethane polymer correspond to groups in the reactant compounds (F), (B), and (D), respectively, wherein the isocyanate-reactive groups in compounds (B), (C), (D), and (F) form urethane linkages in the polyurethane polymer, and wherein compounds (B), (D), and (F) react with isocyanate functionality consisting of the isocyanate functionality of compound (A).

27. The aqueous dispersion of claim 26, wherein the coating formed from the aqueous dispersion when cured is scratch resistant to the extent that after scratch testing with sand (100 double strokes in 20 seconds), at least 74.8% of the initial gloss measured to DIN 67530 is retained.

28. The aqueous dispersion of claim 26, wherein the coating formed from the aqueous dispersion when cured has a micropenetration hardness at 25.6 millinewtons of at least 161.9 Newtons per square millimeter and a penetration depth of no greater than 2.43 micrometers.

29. The aqueous dispersion of claim 26, wherein the coating formed from the aqueous dispersion when cured has a creep at 25.6 millinewtons of no greater than 11.8%.

* * * * *